Sept. 16, 1969  A. BOUDOURIS  3,467,762
UNIVERSAL JUNCTION BOX FOR DRIVE-IN THEATER HEATERS
Filed April 12, 1967  2 Sheets-Sheet 1
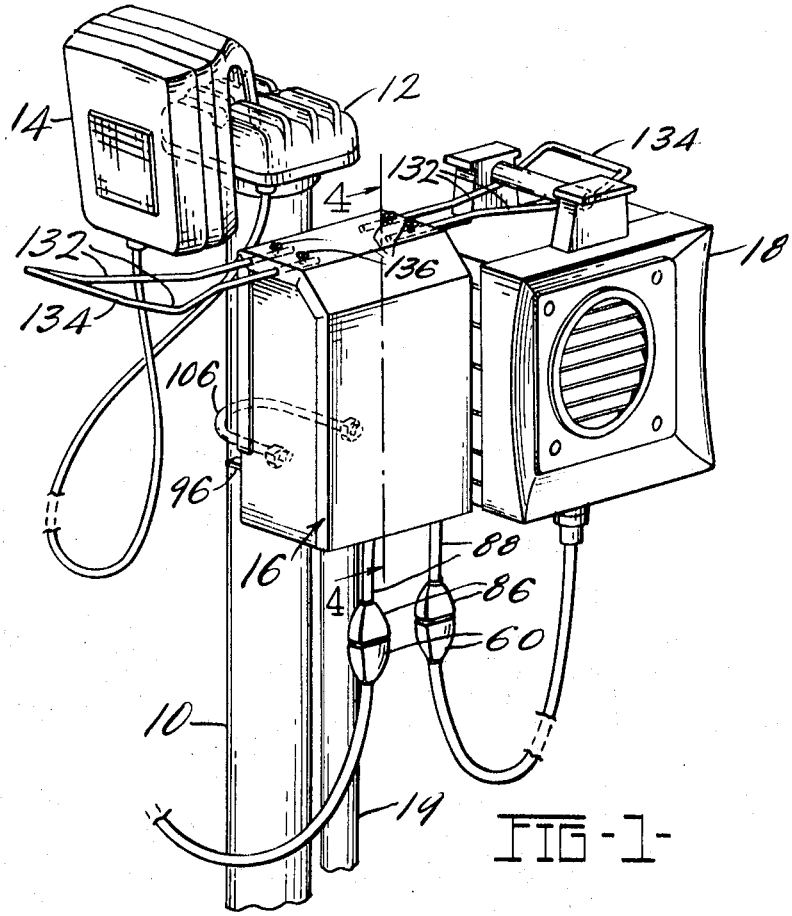
FIG-1-
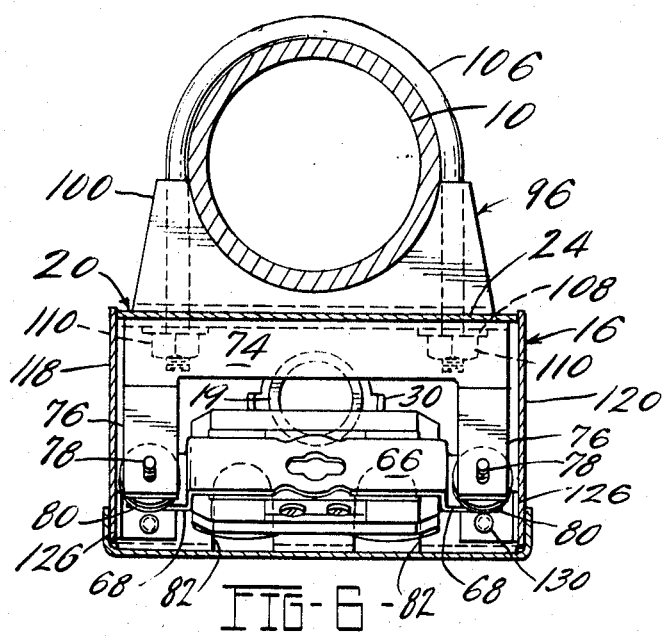
FIG-6-
INVENTOR:
ANGELO BOUDOURIS.
BY Owen & Owen
ATT'YS.

Sept. 16, 1969   A. BOUDOURIS   3,467,762
UNIVERSAL JUNCTION BOX FOR DRIVE-IN THEATER HEATERS
Filed April 12, 1967   2 Sheets-Sheet 2
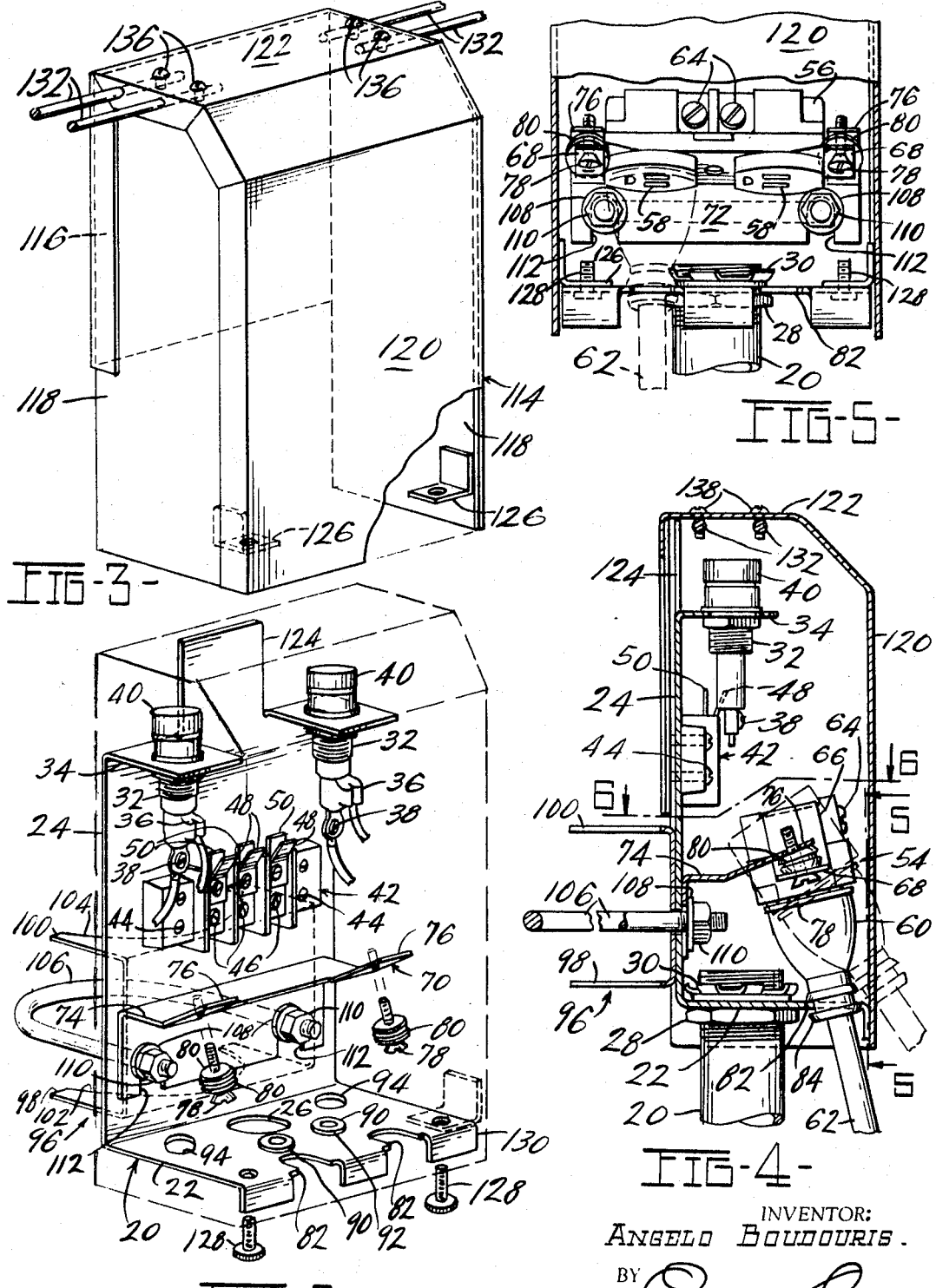
INVENTOR:
ANGELO BOUDOURIS.
BY
ATT'YS.

United States Patent Office 3,467,762
Patented Sept. 16, 1969

3,467,762
UNIVERSAL JUNCTION BOX FOR DRIVE-IN THEATER HEATERS
Angelo Boudouris, Sylvania, Ohio, assignor to Eprad Incorporated, Toledo, Ohio, a corporation of Ohio
Filed Apr. 12, 1967, Ser. No. 630,320
Int. Cl. H01r *13/46;* H05k *5/02*
U.S. Cl. 174—59                          6 Claims

ABSTRACT OF THE DISCLOSURE

A junction box for drive-in theaters is designed to provide almost any conceivable electrical connection for a wide variety of types of car heaters, to permit conformation with electrical codes which vary widely from one area to another. The new junction box is mounted on a post which also supports the speakers, the box separately receiving the electrical lines for the heaters. The junction box can be used with permanently installed or removable heaters; the heaters can also be fused or not fused, and optionally connected to the line power through a terminal board or an electrical receptacle. The latter connection enables the heaters to be permanently mounted yet easily removed for servicing or replacement.

---

The invention relates to an improved junction box and particularly to a junction box for heaters at drive-in theaters.

Drive-in theaters are open during the winter season more commonly than ever. Winter operation of such theaters may become even more widespread as the national advent of daylight savings time decreases the time available in the evening during which outdoor movies can be effectively projected during the summer. Drive-in theaters operated in the wintertime commonly supply, where the climate requires, electrical heaters which provide a comfortable temperature for the occupants of the automobiles. Heretofore, such heaters have been electrically connected to a power supply source through a variety of means. The wide variation has rendered it difficult for manufacturers of drive-in theater equipment to provide effective means for electrically connecting the heaters to the power supply. Consequently, a substantial amount of extra time has been required on behalf of the electricians installing the equipment to provide the proper connections. This has correspondingly increased the installation costs of such equipment.

The present invention provides a new junction box for drive-in theaters which is capable of accommodating a wide variety of types of electrical connections for the heaters with the result that most heater systems can be installed more quickly and less expensively than heretofore. The new junction box enables both permanent and removably-installed heaters to be electrically connected to the source of power with minimum time and effort. The junction box also enables the heaters to be installed by solder, conventional solderless connectors, or a terminal board. The heaters can also be fused or connected directly to the power lines. The cords also can be connected to the box by being knotted or through metal electrical connectors. For removable heaters, which are handed out to patrons as they enter the theater grounds, the junction box can also be provided with pigtails or the like for temporary connections.

The junction box also can be equipped with a conventional receptacle which receives plugs on the cords of the heaters but with the plugs inside the box to provide, in effect, a permanent installation. With this arrangement where the heaters require replacement or repair, the serviceman can simply remove the cover of the box, disconnect the plugs, and take the heater to a warmer location to effect repairs, or he can replace one heater with another quickly and efficiently, repairing the inoperative heater at a later time.

It is, therefore, a principle object of the invention to provide an improved universal junction box for electrically connecting in a number of ways an outdoor heater as employed at a drive-in theater to a source of power.

Another object of the invention is to provide a junction box containing a receptacle within the box which can receive a cord plug of an outdoor heater, by means of which the heater can be quickly disconnected for replacement or repair.

Other objects and advantages of the invention will be apparent from the following detailed description of a preferred emobdiment thereof, reference being made to the accompanying drawings, in which:

FIG. 1 is an overall view in perspective of a junction box embodying the invention and carrying a heater, the box being mounted on a speaker post having a bracket at the upper end for carrying speakers;

FIG. 2 is a view in perspective of a base member of the junction box with certain components mounted thereon;

FIG. 3 is a view in perspective of a cover of the junction box;

FIG. 4 is a view in vertical, longitudinal cross section of the junction box, taken along the line 4—4 of FIG. 1;

FIG. 5 is a fragmentary, front view of a lower portion of the junction box, taken along the line 5—5 of FIG. 4; and FIG. 6 is a view in horizontal cross section taken along the line 6—6 of FIG. 4.

Referring to FIG. 1, a speaker post 10 has a bracket 12 at an upper portion thereof which carries drive-in speakers 14, as is well known in the art. In the usual practice, there is one such post between parking spaces for two cars and two speakers are carried on the post, one for each car. The lines for the speakers extend downwardly through the post 10 and are connected with the central sound system by suitable underground conduits.

In climates where the drive-in theaters operate during cool or cold seasons, car heaters are frequently supplied to the patrons. The heater can be permanently mounted at the speaker stations or can be handed to the patrons as they enter the premises and turned in as they leave, with rental fees usually being collected in such instances. A junction box 16 embodying the invention is used to electrically connect the heaters, such as a heater 18, to a source of power, with the supply lines being contained in a separate conduit or pipe 19 extending alongside the post 10. The heater supply lines are carried in a separate conduit to prevent noise interference with the speaker lines.

Referring more particularly to FIG. 2, the junction box 16 includes a base member 20 having a bottom plate 22 and a back plate 24 located generally at right angles to one another. The bottom plate 22 has an appropriate central opening 26 to receive the supply conduit 19 which can be affixed thereto by nuts 28 and 30 (FIGS. 4 and 5). The supply lines extending upwardly through the bottom plate 22 can be connected to the heater lines in several ways. For permanently mounted heaters, the supply lines can be soldered to the heater lines or connected through solderless connectors, for example. In such an instance, each of the heaters can be individually fused through fuse housings 32 mounted in ears 34 bent inwardly from the back plate 24. The fuse housings 32 can contain fuses which are electrically connected between terminals 36 and 38 and located in series with the heating elements of the heaters 18. The fuse housings 32 have caps 40 threadedly connected to the upper ends thereof which can be removed to enable easy access to the fuses for replacement purposes.

Rather than the solder or solderless connection, a terminal block 42 can be affixed to the back plate 24 by suitable screws 44. The terminal block 42 preferably has a lower set of terminals 46 to accommodate three power lines, especially where 208 volt or 240 volt power is supplied. Two additional sets of terminal tabs 48 and 50 can be provided for two of the heaters 18, the heater lines being provided with slip-on connectors or clips for the tabs. Again, when the terminal block 42 is used, the lines for the heaters can be connected with the fuses of the fuse housings 32 or the heaters can be centrally fused at the supply source.

An additional way in which the heaters can be permanently installed involves a receptacle 54 as shown in FIGS. 4-6. The receptacle 54 is of a conventional, commercially-available type and includes a non-conducting housing 56 having suitable openings, generally indicated at 58, in the face thereof to receive corresponding prongs of male plugs 60 connected to the heaters through lines or cords 62 (FIG. 4). The housing 56 has the usual suitable terminals 64 thereon by means of which the supply lines are connected, and the receptacle also has a metal bracket 66 extending longitudinally thereof and affixed thereto, with outwardly extending end ears or flanges 68. The flanges 68 are connected to a receptacle bracket 70, as best shown in FIG. 2, which includes a rear mounting plate 72 and a horizontal plate 74 terminating in angular tabs 76 to which the end flanges 68 are connected by suitable mounting screws 78. These extend through openings in the end flanges 68 and are threadedly received in openings in the tabs 76.

Rubber rings 80 or other suitable flexible or resilient means are located around the screws 78 between the end flanges 68 and the tabs 76 to enable the receptacle 54 to rock or pivot somewhat with respect to the bracket 70. This is an important feature because it enables the receptacle 54 to move enough to facilitate assembly and dis-assembly of the plugs 60 with respect to the openings 58 in the face of the receptacle.

As shown in FIG. 4, when the plugs are inserted in the receptacle or removed therefrom, the receptacle is pivoted to the position shown in dotted lines. The receptacle is then pivoted back to the normal position shown in solid lines with the heater cords 62 then received in front notches 82 of the bottom plate 22. For this purpose, the cords 62 preferably have grommets 84 thereon to minimize possible damage to the cords.

This arrangement of the receptacle 54 provides an effective means for permanently mounting the heaters with respect to the junction box 16 and yet enables a serviceman to easily and quickly disconnect the heaters, if necessary, by removing the cover and pivoting the receptacle outwardly to enable the plugs to be removed. The heaters can thereby be quickly and easily disconnected and replaced or taken to a more convenient location for repair.

For temporarily mounting the heaters 18, pigtails 86 (FIG. 1) can be employed, the pigtails extending from the bottom of the junction box 16 to receive the plugs 60 of the heater lines. Pigtail cords 88 can extend into the junction box through openings 90 (FIG. 2) in the bottom plate 22 having grommets 92 therein. The pigtail cords 88 can then be connected to the main supply lines through solder or solderless connectors or through the terminal block 42, as before. The openings 90 also can receive the heater cords 62 when connected to the supply line by means other than the receptacle 54, e.g. by connectors or the terminal block, in which case the cords can be knotted or held by a suitable fitting within the box to prevent removal. Rather than using the openings 90, however, half-inch knock-outs 94 in the bottom plate 22 can be employed to receive half-inch cable clamp or BX connectors, if desired, for the heater wires.

To mount the base member 20 on the post 10, a U-shaped flange member 96 is affixed to the back plate 24, as by spot welding. The flange member 96 has two flanges 98 and 100 extending rearwardly therefrom, these having notches or edges 102 and 104 which fit around the speaker post 10, as shown particularly in FIG. 6. A U-bolt 106 is located between the flanges 98 and 100 and extends around the post 10 and through openings in the back plate, to which the U-bolt is connected by washers 108 and nuts 110. The U-bolt 106 also extends through notches 112 in the bracket plate 72 to affix the bracket 70 to the back plate. The notches enable the bracket 70 to be vertically adjusted somewhat to enable the receptacle to accommodate various designs of the heater plugs 60.

The junction box 116 also has a cover 114 as shown particularly in FIG. 3. The cover 114 includes a back wall 116 fitting over the back plate 24. The cover also includes side walls 118, a front wall 120, and a top 122. When the cover is placed over the base member 20, it is slid downwardly thereon until a projection 124 (FIG. 2) of the back plate 24 abuts the top 122. At this point, side tabs 126, affixed to the side walls 118, are in a position just above the bottom plate 22. Theft proof bolts or screws 128 are then inserted through openings 130 in the bottom plate and are threadedly received in the tabs 126 to complete the assembly of the cover and the base. The screws 128 can be removed only with a special tool.

Particularly in an instance where the heaters are permanently mounted with respect to the junction box, the junction box can be provided with heater-carrying arms 130. These arms each include a pair of legs 132 and a cross leg 134 on which the heater is carried. The legs 132 extend through openings in the upper edge portions of the side walls 118 and are received immediately below the top 122 of the cover. The top has openings 136 therein through which fastening screws 138 (FIG. 4) are inserted and threaded into transverse tapped openings in the legs 132. As is true with most of the other components of the junction box 16, the heater-carrying arms 130 are optional equipment for the junction box, in order to meet the particular requirements for a given installation.

It will thus be seen that the junction box 16 is capable of accommodating almost any type of installation according to the type of heater employed and the electrical code for almost any location throughout the country.

Numerous modifications of the above described embodiment of the invention will be apparent to those skilled in the art and it is to be understood that such modifications can be made without departing from the scope of the invention, if they are withinn the spirit and the tenor of the accompanying claims.

I claim:

1. A universal junction box for drive-in theater heaters, said box comprising a base member forming a back wall and a bottom, a cover forming a top wall and a front, said cover and said base member having means for receiving fasteners for attachment to one another, fasteners affixing said cover to said base member through said fastener-receiving means, said back wall of said base member having ears extending forwardly to receive fuse housings at an upper portion of said base member, said bottom having a large opening to receive a conduit carrying main electrical lines for the power supplied to the heaters, said bottom further having notches at a forward edge portion thereof for receiving lines for heaters, and said bottom further having means forming two additional openings therein for receiving heater lines, a terminal block affixed to said back wall for connecting heater lines to power lines, said back wall having rearwardly-extending flange means to engage a speaker post, bolt means extending through openings in said back wall to attach said junction box to the post, and a bracket affixed to a lower portion of said back wall and extending forwardly to carry a downwardly-facing receptacle.

2. A universal junction box according to claim 1 characterized further by said cover having sidewalls with openings near the top wall, a pair of generally U-shaped heater hangers having legs extending through said openings, and fastening means for affixing said legs within said junction to said top wall of said cover.

3. A junction box for heaters for a drive-in theater, said box including plate means forming a back wall of the box, cover means, means for affixing said back wall to a speaker-carrying post, means attaching said cover means to said plate means, a bracket affixed to said back wall, a receptacle carried by said bracket and facing downwardly to receive plugs of heater lines, and means connecting said receptacle and said bracket to enable said receptacle to pivot with respect to said bracket.

4. A junction box according to claim 3 characterized further by said connecting means being flexible in part.

5. A junction box according to claim 3 characterized further by means for attaching said bracket to said back wall to enable said bracket to be vertically adjusted with respect to said back wall.

6. A junction box according to claim 3 wherein said plate means also forms a bottom of said box, said bottom having a pair of notches in a front edge thereof for receiving the heater cords connected with the plugs of the heaters.

References Cited

UNITED STATES PATENTS

| | | | |
|---|---|---|---|
| 2,469,986 | 5/1949 | Phyfe | 174—52 X |
| 3,375,620 | 4/1968 | Phillips | 174—38 X |

FOREIGN PATENTS

| | | |
|---|---|---|
| 209,750 | 1/1956 | Australia. |

OTHER REFERENCES

The Master, United Catalog Publishers Inc., 22nd ed., 1958, p. K–675.

LEWIS H. MYERS, Primary Examiner

D. A. TONE, Assistant Examiner

U.S. Cl. X.R.

174—52